(12) United States Patent
Koch

(10) Patent No.: US 7,265,317 B2
(45) Date of Patent: Sep. 4, 2007

(54) METHOD OF CUTTING MATERIAL WITH HYBRID LIQUID-JET/LASER SYSTEM

(75) Inventor: Steven J. Koch, Zimmerman, MN (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 322 days.

(21) Appl. No.: 10/766,793

(22) Filed: Jan. 28, 2004

(65) Prior Publication Data

US 2005/0160891 A1 Jul. 28, 2005

(51) Int. Cl.
*B23K 26/38* (2006.01)

(52) U.S. Cl. .......................... 219/121.72; 219/121.71; 219/121.84

(58) Field of Classification Search ........... 219/121.67, 219/121.72, 121.84, 121.71; 83/53, 54
See application file for complete search history.

(56) References Cited

U.S. PATENT DOCUMENTS

| | | | |
|---|---|---|---|
| 5,073,694 A | 12/1991 | Tessier et al. | |
| 5,345,057 A | 9/1994 | Muller | |
| 5,356,081 A * | 10/1994 | Sellar | 219/121.62 |
| 5,444,211 A * | 8/1995 | Nakata et al. | 219/121.67 |
| 5,480,807 A | 1/1996 | Monnier et al. | |
| 5,500,503 A | 3/1996 | Pernicka et al. | |
| 5,514,154 A | 5/1996 | Lau et al. | |
| 5,688,418 A * | 11/1997 | Yoshiyasu et al. | 219/121.72 |
| 5,759,192 A | 6/1998 | Saunders | |
| 5,780,807 A | 7/1998 | Saunders | |
| 5,856,649 A * | 1/1999 | Yamazaki et al. | 219/121.67 |
| 5,906,759 A | 5/1999 | Richter | |
| 5,913,897 A | 6/1999 | Corso, Jr. et al. | |
| 5,922,005 A | 7/1999 | Richter et al. | |
| 5,935,506 A | 8/1999 | Schmitz et al. | |
| 5,952,277 A | 9/1999 | Radu et al. | |
| 5,994,667 A | 11/1999 | Merdan et al. | |
| 6,042,597 A | 3/2000 | Kveen et al. | |
| 6,100,498 A * | 8/2000 | Nakata | 219/121.72 |
| 6,114,653 A | 9/2000 | Gustafson | |

(Continued)

FOREIGN PATENT DOCUMENTS

EP 0 985 484 A2 3/2000

(Continued)

OTHER PUBLICATIONS

"Laser Tape—a UV-Tape for the Laser Dicing Process" specification sheet, 1 pg., Aug. 14, 2003, http://www.synova.ch/tech_tape.html.

(Continued)

*Primary Examiner*—Geoffrey S. Evans
(74) *Attorney, Agent, or Firm*—Crompton, Seager & Tufte LLC

(57) ABSTRACT

A hybrid liquid-jet/laser device may be used to remove material from a tube or sheet to form a medical device, such as a stent. The liquid-jet/laser stream may be impinged against the wall of the tube or sheet between the ends of the tube or sheet, wherein an aperture may be formed in the tube or sheet, followed by a lead-in, and then a full thickness cut. A full thickness cut should be achieved via a lead-in before moving the liquid-jet/laser stream along a final cut path.

22 Claims, 4 Drawing Sheets

U.S. PATENT DOCUMENTS

| | | | |
|---|---|---|---|
| 6,131,266 A | 10/2000 | Saunders | |
| 6,160,240 A | 12/2000 | Momma et al. | |
| 6,168,621 B1 | 1/2001 | Vrba | |
| 6,197,047 B1 | 3/2001 | Kranz | |
| 6,197,048 B1 | 3/2001 | Richter | |
| 6,240,616 B1 | 6/2001 | Yan | |
| 6,253,443 B1 | 7/2001 | Johnson | |
| 6,309,414 B1 | 10/2001 | Rolando et al. | |
| 6,312,463 B1 * | 11/2001 | Rourke et al. | 623/1.39 |
| 6,344,055 B1 | 2/2002 | Shukov | |
| 6,348,065 B1 | 2/2002 | Brown et al. | |
| 6,369,355 B1 | 4/2002 | Saunders | |
| 6,491,718 B1 | 12/2002 | Ahmad | |
| 6,521,865 B1 | 2/2003 | Jones et al. | |
| 6,563,080 B2 | 5/2003 | Shapovalov et al. | |
| 6,565,602 B2 | 5/2003 | Rolando et al. | |
| 6,572,647 B1 | 6/2003 | Supper et al. | |
| 6,641,607 B1 | 11/2003 | Hossainy et al. | |
| 6,652,573 B2 | 11/2003 | Von Oepen | |
| 6,696,667 B1 * | 2/2004 | Flanagan | 219/121.72 |
| 6,777,647 B1 * | 8/2004 | Messal et al. | 219/121.84 |
| 2002/0035394 A1 * | 3/2002 | Fierens et al. | 623/1.13 |
| 2002/0055770 A1 | 5/2002 | Doran et al. | |
| 2002/0108937 A1 | 8/2002 | Shapovalov et al. | |
| 2002/0193866 A1 | 12/2002 | Saunders | |
| 2003/0226833 A1 | 12/2003 | Shapovalov et al. | |
| 2003/0234244 A1 | 12/2003 | McCoy | |
| 2004/0004061 A1 | 1/2004 | Merdan et al. | |
| 2004/0004063 A1 | 1/2004 | Merdan | |

FOREIGN PATENT DOCUMENTS

| | | |
|---|---|---|
| FR | 2 743 318 A1 | 7/1997 |
| JP | 56-99091 A * | 8/1981 |
| JP | 5-224727 A * | 9/1993 |

OTHER PUBLICATIONS

"Comparison Water jet—Laser—Microjet", 4 pgs., Aug. 14, 2003, http://www.synova.ch/tech_comparison.html.

"Laser Microjet, technical data", 1 pg., Aug. 14, 2003, http://www.synova.ch/tech_data.html.

"A bright idea that puts the competition in the shade", 1 pg., Aug. 11, 2003, http://www.synova.ch/tech_microjet.html.

Shaeffer, Laser-Manufactured Features in Medical Catheters and Angioplasty Devices, 8 pgs., Aug. 15, 2003, http://www.devicelink.com/mddi/archieve/96/11/011.html.

Synova S.A., "Cutting of stents with SYNOVA Laser-Microjet", Application Note No. 111.

* cited by examiner

METHOD OF CUTTING MATERIAL WITH HYBRID LIQUID-JET/LASER SYSTEM

BACKGROUND

Implantable medical devices, such as a stents, grafts, stent-grafts, vena cava filters and the like, and delivery assemblies are utilized in a number of medical procedures and situations, and as such their structure and function are well known.

Self-expanding, inflation expandable and hybrid stents are available in a variety of designs and configurations. Examples are disclosed in U.S. Pat. No. 6,348,065, U.S. 2002-0055770-A1 and U.S. Pat. No. 6,168,621, incorporated herein by reference.

Stents are generally tubular but have been embodied in many different configurations and have been made of many materials, including metals and plastic. Ordinary metals such as stainless steel have been used, as have shape memory metals such as Nitinol and the like. Stents may also be made of bio-absorbable plastic materials. Stents may be formed from wire, flat sheets, tube stock, and the like.

A number of techniques have been suggested for the fabrication of stents from sheets and tubes. One such technique involves laser cutting a pattern into a sheet of material and rolling the sheet into a tube, or directly laser cutting the desired pattern into a tube. Other techniques involve cutting a desired pattern into a sheet or a tube via chemical etching or electrical discharge machining.

Laser cutting of stents has been described in a number of publications including U.S. Pat. No. 5,780,807 to Saunders, U.S. Pat. No. 5,922,005 to Richter and U.S. Pat. No. 5,906,759 to Richter, the disclosures of which are incorporated herein by reference. Other references wherein laser cutting of stents is described include: U.S. Pat. No. 5,514,154, U.S. Pat. No. 5,759,192, U.S. Pat. No. 6,131,266 and U.S. Pat. No. 6,197,048, the disclosures of which are incorporated herein by reference.

A typical laser cutting system relies on a laser to produce a beam which is conditioned as necessary via an optical unit and focused into a spot beam which is impinged against a hollow tube that is to become the stent. The hollow tube may be moved via a rotational motor drive and linear motion drive.

An example of a conventional laser for cutting a stent is a highly focused pulsed Nd:YAG laser which has a pulse duration in the range of approximately 0.1 to 20 milliseconds. This is a long pulse time for cutting and characteristically produces a relatively large melt zone and heat affected zone (HAZ) on the metal. The conventional laser cutting process typically results in the formation of melt dross on the inside edge of the cut tube or sheet. This dross must be cleaned off in subsequent processes.

Cutting and processing systems have been developed that incorporate a water column and laser. SYNOVA Inc., of Lausanne, Switzerland, provides a laser-microjet that uses a laser beam that is contained within a water jet similar in principle to an optical fiber transmission.

The SYNOVA laser-microjet relies on a low pressure water column to contain the laser, to act as a cooling mechanism and to remove cutting debris.

The use of a hybrid liquid-jet/laser system such as the SYNOVA system to cut a stent presents new manufacturing concerns. Procedures which produce a satisfactory end product when using a conventional laser system are not generally applicable when using a hybrid liquid-jet/laser system. Thus, new procedures must be developed.

All U.S. patents and applications and all other published documents mentioned anywhere in this application are incorporated herein by reference in their entirety.

A brief summary of some of the claimed embodiments is set forth below. Additional details of the summarized embodiments and/or additional embodiments may be found in the Detailed Description below.

A brief abstract of the technical disclosure in the specification is provided as well only for the purposes of complying with 37 C.F.R. 1.72. The abstract is not intended to be used for interpreting the scope of the claims.

BRIEF SUMMARY

In one embodiment, the present invention pertains to a method of providing one or more shaped openings through a material, the method comprising of a material having an interior portion, and providing a cutting device to cut the material with a hybrid liquid-jet/laser stream. The hybrid stream may be impinged against the surface of the material while the material is moved relative to the stream at a first velocity. When the hybrid stream fully penetrates the material, the material may be moved relative to the stream at a second velocity, with at least a portion of the stream continuing to fully penetrate the material so as to provide an opening of a predetermined shape in the material.

In another embodiment, the present invention comprises a method of providing one or more shaped openings through the wall of a tube of material comprising of a tube of material having a thickness and a cutting device to provide a hybrid liquid-jet/laser stream. A cut lead-in may be established by moving the tube relative to the stream until the stream fully penetrates the thickness of the tube. Thereafter, the tube may be moved relative to the stream to provide a cut along a predetermined cut path. The pulse rate and the pulse energy of the laser can be varied to reduce the lead-in path length required.

These and other embodiments are pointed out with particularity in the claims annexed hereto and forming a part hereof. However, for a better understanding of the invention, its advantages and objectives obtained by its use, reference should be made to the drawings which form a further part hereof and the accompanying descriptive matter, in which there is illustrated and described an embodiment.

BRIEF DESCRIPTION OF THE SEVERAL VIEWS OF THE DRAWING(S)

A detailed description is hereafter described with specific reference being made to the drawings.

FIG. 2 is a perspective view of a hybrid liquid-jet/laser stream cutting through a material interior region using a lead-in.

DETAILED DESCRIPTION

Figure 1:
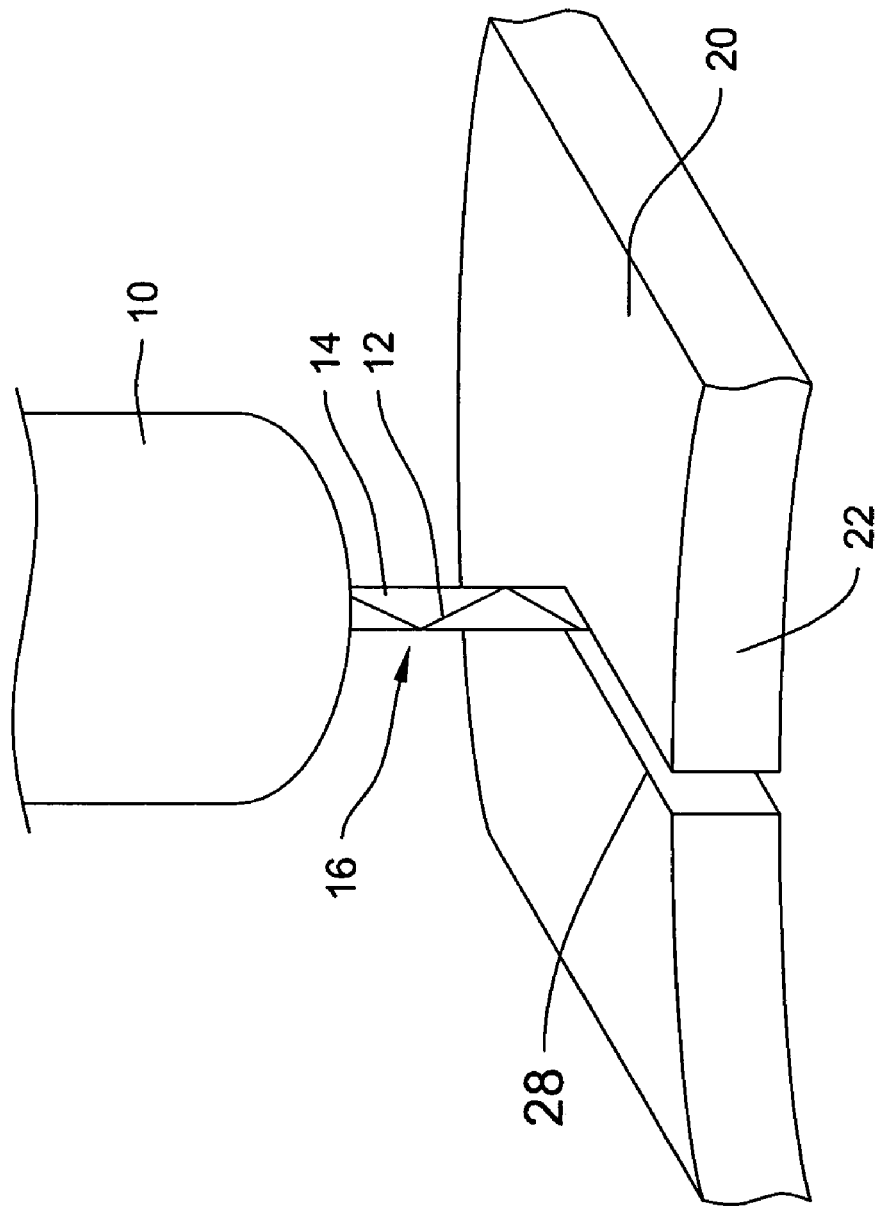
FIG. 1 is a perspective view of a hybrid liquid-jet/laser stream cutting through a material.

While this invention may be embodied in many different forms, there are described in detail herein specific embodiments. This description is an exemplification of the principles of the invention and is not intended to limit the invention to the particular embodiments illustrated.

For the purposes of this disclosure, like reference numerals in the figures shall refer to like features unless otherwise indicated.

U.S. patent application Ser. No. 10/190,975 disclosing a vertical stent cutting process, and U.S. patent application Ser. No. 10/190,424 disclosing a tubular cutting process and system, are incorporated herein by reference.

A hybrid liquid-jet/laser system may be used to cut or otherwise remove material from a tube or a flat sheet or web of material. A hybrid liquid-jet/laser system comprises a liquid stream, a low pressure stream, and a laser beam. The laser beam may be entrained within the liquid stream. When the hybrid stream containing both the liquid stream and the laser are impinged against a surface, material ablated by the laser may be carried away by the liquid stream. Thus, dross and redeposited material may be kept to a minimum. Further, the liquid stream may immediately cool the surface, thereby reducing any heat affected zone (HAZ).

Although the use of a hybrid liquid-jet/laser stream has proven effective in cutting materials when the cut begins from an edge of the material, the hybrid liquid-jet/laser stream has not proven effective at cutting when starting at a location which is not an edge. It has been discovered that a lead-in path is necessary in order to cut materials when the starting path does not lie along an edge. A lead-in may be a certain length of travel that must be traversed before consistent full-thickness cutting of the material is accomplished. A lead-in path is made through an area of eventual waste. It is often desirable to minimize the length of a lead-in.

FIG. 1 depicts a hybrid liquid-jet/laser system 10 cutting a stock of material 20 using a laser 12 entrained within a column of liquid 14, or a hybrid liquid-jet/laser stream 16. A cut 28 is generally accomplished having penetration through the full thickness of the material 20. The width of the cut 28 is generally the same dimension as the diameter of the liquid column 14.

When a material 20 is moved into the hybrid stream 16, wherein the stream 16 first engages an edge 22 of the material, a full thickness cut is generally accomplished. However, if the hybrid stream 16 is impinged against a wall portion of the material 20 at a location other than an edge, such as an interior portion, a lead-in distance may be required to be traversed before a full thickness cut of proper width can be accomplished. Thus, when creating an opening in a wall of material 20, a lead-in path may be required.

Figure 2:
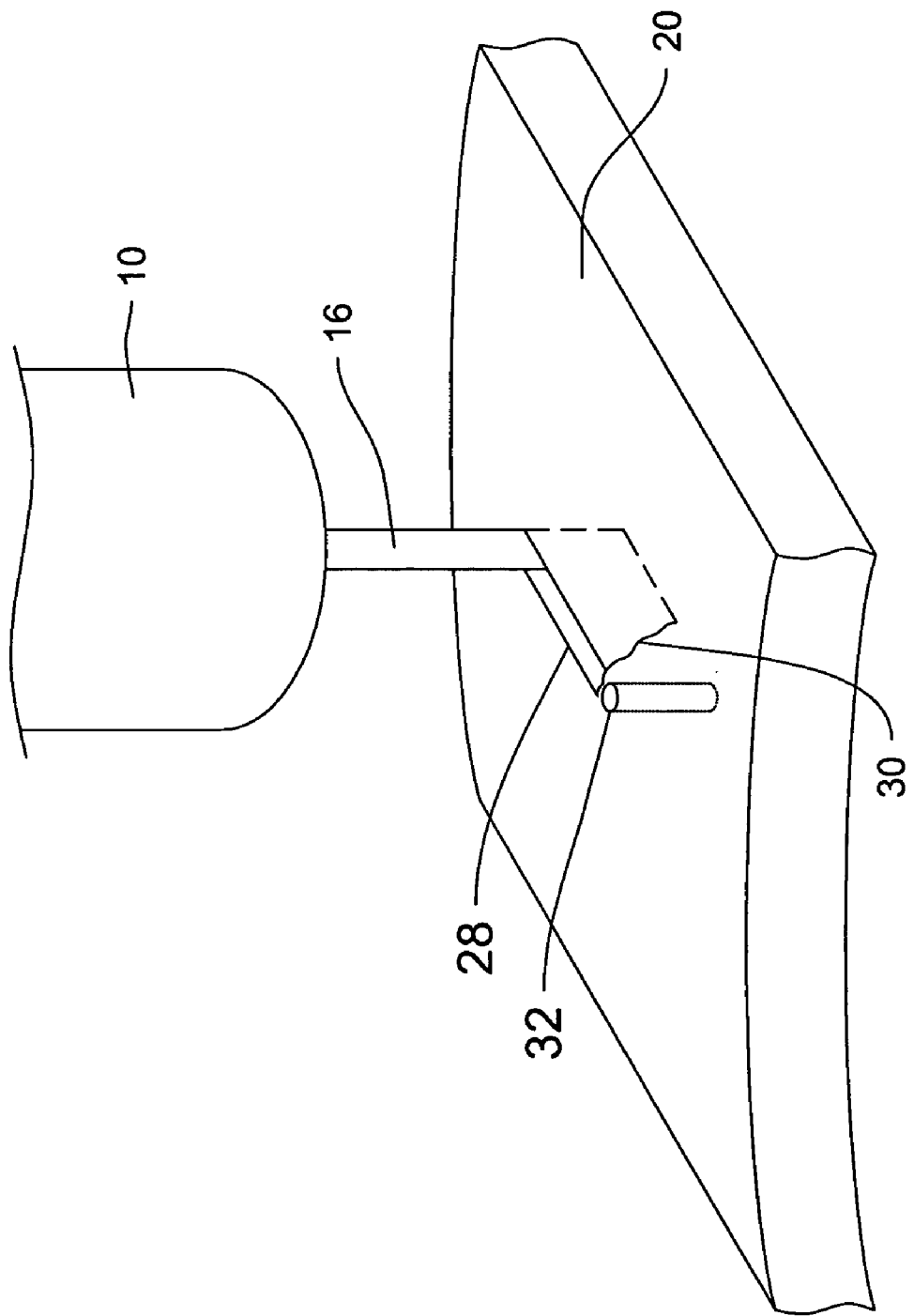
Figure 3:
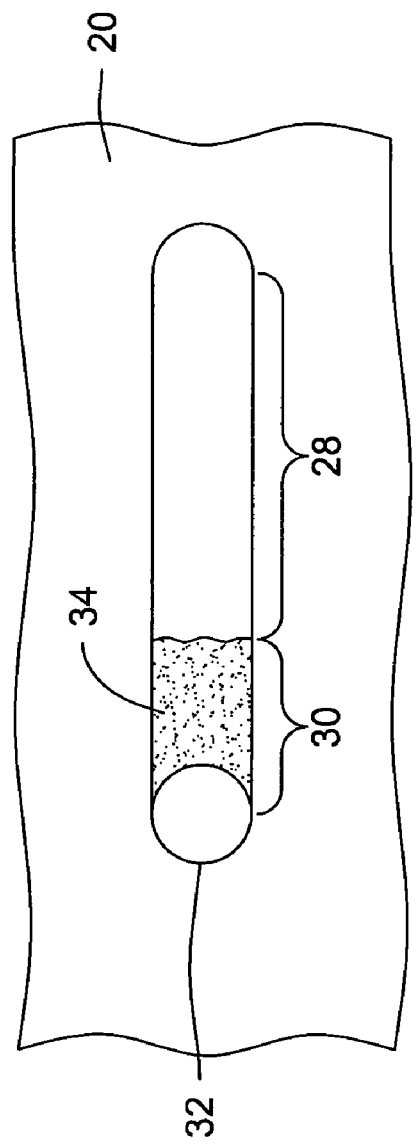
FIG. 3 is a plan view of a lead-in cut.
Figure 4:
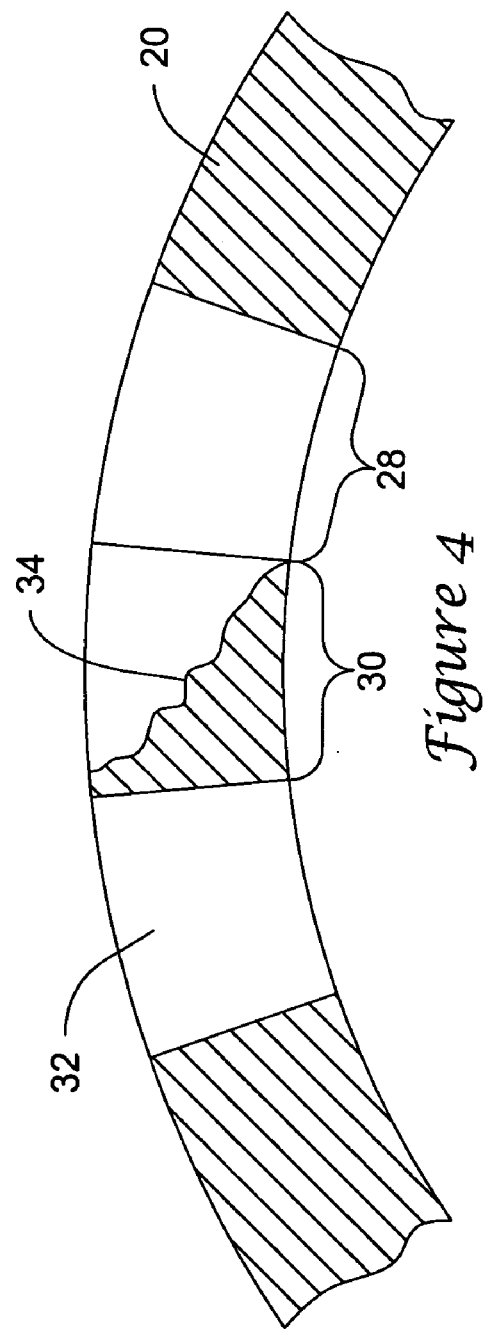
FIG. 4 is a cross-sectional view of a lead-in cut.

FIGS. 2-4 depict a material 20 having a cut 28 and a lead-in 30. When the hybrid stream 16 is first impinged against a wall surface of a material 20, it will generally create an initial punch-through or aperture 32. The aperture 32 comprises a penetration of the full thickness of the material 20, and generally has a diameter slightly larger than the diameter of the liquid column 14 of the hybrid stream 16.

After the aperture 32 is cut, unless the material is very thin, the hybrid stream 16 will generally not penetrate the full thickness of the material 20 immediately upon displacement of the material 20 relative to the hybrid stream 16. Thus, a lead-in 30 path length will be traversed wherein only a partial penetration of the material 20 is accomplished. The width of a lead-in 30 cut is generally slightly larger than the width of the water column 14 of the hybrid stream 16. The depth of the lead-in 30 through the thickness of the material 20 generally increases with the distance traversed, although a jagged surface 34 having peaks and troughs can be created along the lead-in 30 path.

FIG. 3 depicts a plan view of the aperture, lead in and full thickness cut of FIG. 2.

FIG. 4 depicts a sectional view of an aperture 32, lead-in 30 and full thickness cut 28 achieved in a tube of material 20. The generally increasing depth of the lead-in 30 and a jagged surface 34 are best shown in the sectional view of FIG. 4. When the lead-in 30 has penetrated the full thickness of the material 20, a full thickness cut 28 is achieved and may be maintained as long as the material 20 continues to be displaced with respect to the hybrid stream 16. If the displacement is stopped, an additional lead-in 30 is generally required before a full thickness cut 28 can again be achieved.

Figure 5:
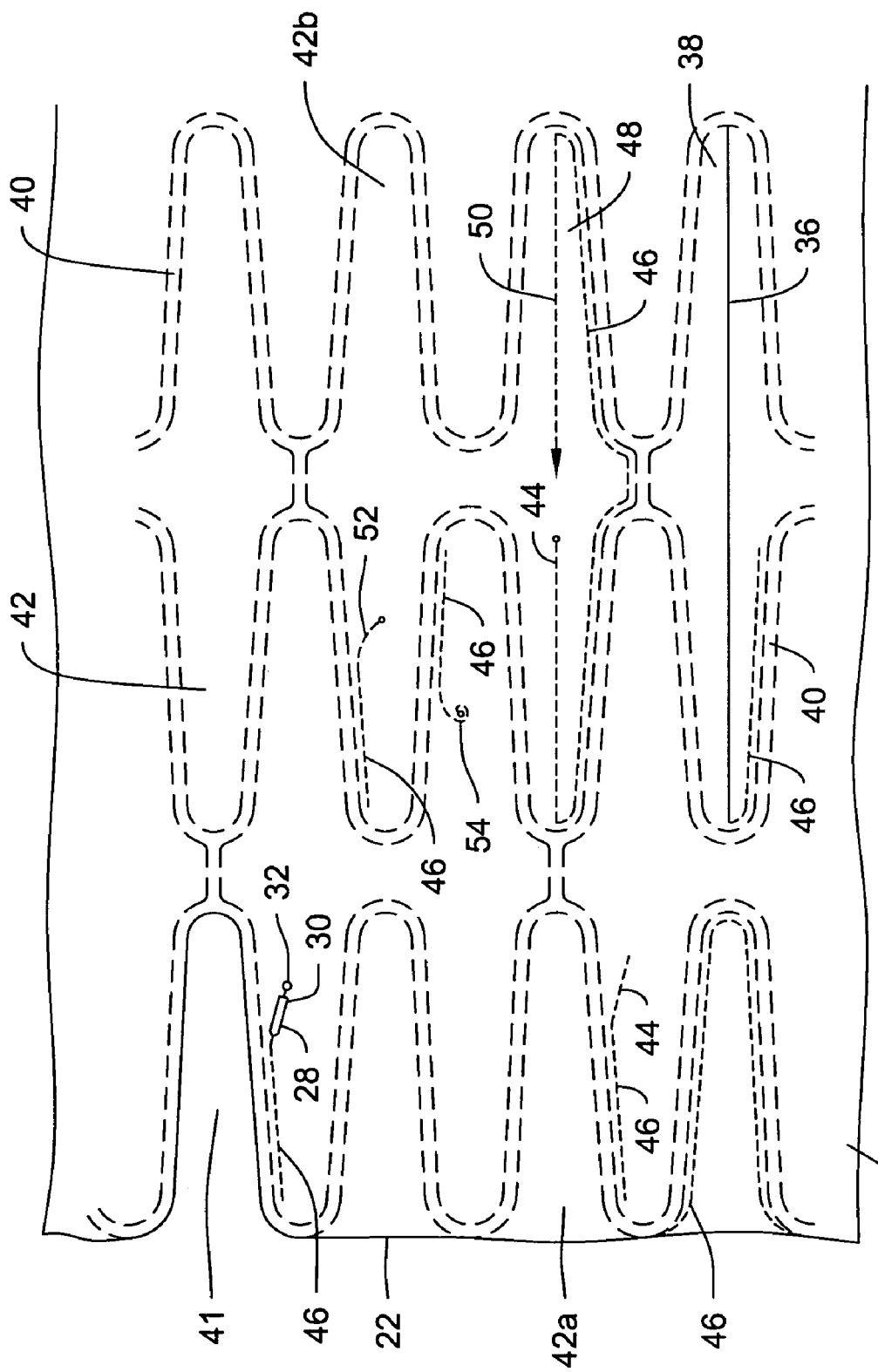
FIG. 5 is a plan view of a material showing a stent cutout pattern, lead-in paths and final cut paths.

FIG. 5 shows an outline stent pattern 40 which may be used to create a stent from a piece of material 20. The pattern 40 forms an outline defining material to be removed 42 from the stock material 20. The material to be removed 42 can be cut from the stock material 20 to form a plurality of cells 41. Thus, a stent may be formed which comprises a generally cylindrical framework having a plurality of cells 41. Cells 41 are generally bounded by material 20 that is left according to the pattern 40, although cells 41 formed at the end regions of a stent are generally not entirely bounded by material 20. The removed material 42 will generally become waste material and be discarded. Material to be removed 42 may further be described as a material zone 42 which will be removed. A material zone 42 may comprise an edge zone 42a, which abuts an edge 22 of the material 20. A material zone 42 may also comprise an interior zone 42b having an area depicted by a portion of the dashed stent pattern 40 outline, wherein the eventual cell 41 must be formed by removing from an interior portion 42b of the material.

When removing a portion of material 42 from an edge zone 42a, the cut 28 may begin from the edge 22 of the material 20, and the entirety of the cut 28 may be made along a final cut path 46. However, material may also be removed from an edge zone 42a by beginning a cut 28 in an interior area of the edge zone 42a using a lead-in 30, using a procedure as described below.

When removing material from an interior zone 42b, a lead-in 30 should generally be used. A lead-in path 44 is located in an interior zone 42b, or an area of eventual waste. A lead-in path 44 may be as short as possible, and may be arranged to allow traversal of the final cut path 46 upon achieving a full thickness cut 28. The hybrid stream 16 may be impinged against the wall surface of the material 20 to form an aperture 32. While forming the aperture 32, an initial dwell can be beneficial in achieving a penetration of the full thickness of the material 20. An initial dwell may be programmed into the motion control system, during which the material 20 remains stationary with respect to the hybrid stream 16. An initial dwell will generally lead to an aperture 32 having a diameter slightly larger than the diameter of the liquid column 14. An initial dwell ranges from 50-500 milliseconds. Upon achieving an aperture 32, the material 20 should immediately be displaced relative to the hybrid stream 16 to ensure a successful lead-in 30 and cut 28. When a full thickness cut 28 is achieved, the hybrid stream 16 can be maneuvered along the final cut path 46.

A cell 41 may also be made by removing zone material 42 using two or more cuts. Thus, some zone material 42 may be removed with a first cut, and additional or remaining zone material 42 may be removed in one or more subsequent cuts. Removing portions of zones 42 may be desirable so that the stock material 20 may retain a greater amount of structural integrity during cutting. For example, when cutting a stent from a tube of material 20, it may be desirable to first cut a portion 48 of each zone 42 around the entire circumference of the tube, and then to remove the remainder of the zones 42.

A portion 48 of a zone 42, the portion 48 having an area less than the area of each zone 42, may be removed using a lead-in path 44, and cutting along a portion of a final cut path 46 after a lead-in 30 length has been traversed. In some cases, a lead-out path 50 is desirable. A lead-out comprises a continuance of a full thickness cut 28 away from a final cut path 46 and into the interior of a zone 42. A lead-out path 50 may join with a lead-in path 44 to complete removal of the portion 48 of material 20 from the zone 42. A portion 48 of an adjacent zone 42 may then be removed.

Each zone 42 may be divided into multiple portions 48 as desired. When a portion 48 of an interior zone 42 is removed, the zone 42 is left with an opening or partial cell 38 and an interior edge portion 36. When later removing remaining material 20 from a zone 42 having an opening 38, the hybrid stream 16 may begin a cut 28 at an interior edge portion 36. The cut 28 may be made along a final cut path 46, as a lead-in 30 is not necessary.

The length required for a lead-in 30 can change depending upon the material 20 being used, and the thickness of the material 20. Generally, a thinner piece of material 20 will require a shorter lead-in 30 than a thicker piece of the same material 20.

Any suitable material 20 may be used to form a medical device using the hybrid stream 16. For example, stents may be made from polymeric materials, metals, ceramics and composites. Suitable polymeric materials include thermotropic liquid crystal polymers (LCP's). Where the stent is made of metal, the metal may be stainless steel, cobalt chrome alloys such as elgiloy, tantalum, Zr or Nb or other plastically deformable metals. Other suitable metals include shape-memory metals such as nickel-titanium alloys generically known as "Nitinol", platinum/tungsten alloys and titanium alloys.

It has been found that cutting through a piece of Nitinol generally requires a longer lead-in 30 than when cutting through a piece of stainless steel of similar thickness. For example, when cutting Nitinol having a thickness ranging from approximately 0.009 inches to approximately 0.012 inches, it is generally desirable to allow for a lead-in path 44 length of at least 0.035 inches to ensure a full thickness cut 28 before encountering the final cut path 46.

Varying the diameter of the liquid column 14 of the hybrid stream 16 can affect the lead-in 30. It is desirable to use as small a diameter liquid column 14 as possible that will support the laser 12 being used. Example liquid column 14 diameters are 60 microns, 50 microns and 40 microns. The flow rate of the liquid column 14 is generally varied according to the diameter.

Varying the rate of displacement of the material 12 with respect to the hybrid stream 16 can affect the lead-in 30. A slower rate of travel is desirable during initial piercing and lead-in 30, whereafter the speed may be increased. An initial dwell may also be used during the initial piercing. For example, when the hybrid stream 16 is impinged against the material surface 20, there may be an initial dwell of 50 to 500 milliseconds. Thereafter, the material 20 may be moved at a rate of 0.05 inches per second with respect to the hybrid stream 16 during the lead-in 30. Upon full thickness penetration, a desired cutting speed may be used. The desired cutting speed may be 1 to 2 inches per second, or faster depending upon the particular motion control system being used.

Varying the laser 12 pulse rate and pulse power can affect the lead-in 30. A lower pulse repetition having higher peak energy may be desirable during the lead-in 30 for reducing the length of the lead-in 30. For example, when using a Q-switched laser, the pulse repetition rate may be 11-14 kHz during the lead-in. Thereafter, the pulse repetition rate may be increased to 12-15 kHz. A faster pulse repetition rate having lower peak energy may create a cleaner final cut 28.

The shape of the lead-in path 44 can be a straight line, but may be curved if desired. FIG. 5 shows two embodiments of curved lead-in paths: an arcuate lead-in path 52 and a spiral lead-in path 54. A curved lead-in 30 may require a longer distance to be traversed than a straight lead-in 30 through the same material.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments. Those skilled in the art may recognize other equivalents to the specific embodiment described herein which equivalents are intended to be encompassed by the claims attached hereto.

The invention claimed is:

1. A method of providing one or more shaped openings through a material comprising:
   1) providing a material having at least one edge portion, an interior zone having a first area and an interior portion being within the interior zone and having a second area being less than the first area;
   2) providing a cutting device to cut said material, said cutting device providing a hybrid liquid-jet/laser stream;
   3) impinging the stream against the interior portion of the material while moving said material relative to said stream at a first velocity until said stream fully penetrates the material;
   4) thereafter impinging the stream against the material while moving said material relative to said stream at a second velocity, at least a portion of the stream continuing to fully penetrate the material so as to remove the material of the interior portion, the second area being greater than the area directly penetrated by the stream; and 5) then removing the remainder of the material from the interior zone.

2. The method of claim 1, further comprising:

2a) impinging the stream against the interior portion of the material to form an aperture during an initial dwell.

2b) thereafter accelerating said material relative to said stream to a first velocity.

3. The method of claim 2, wherein the initial dwell ranges from 50-500 milliseconds.

4. The method of claim 1, wherein said first velocity is lower than said second velocity.

5. The method of claim 1, wherein said liquid is water.

6. The method of claim 1, wherein steps 3) and 4) are repeated one or more times so as to cut a plurality of openings of predetermined shape in the material.

7. The method of claim 6 wherein the material is repositioned relative to the stream in between repetition of steps 3) and 4).

8. The method of claim 7, wherein the material is a stent precursor.

9. The method of claim 7, wherein the material is a catheter precursor.

10. The method of claim 7, wherein the material is a flat sheet of material.

11. The method of claim 7, wherein the material is a tube.

12. The method of claim 11, wherein the material is a catheter tube precursor.

13. The method of claim 11, wherein said tube is metal.

14. The method of claim 13, wherein the tube is a stent precursor.

15. The method of claim 1, wherein a plurality of openings are provided in the material to form a stent.

16. The method of claim 1, wherein said material is moved with the cutting device remaining stationary.

17. A method of cutting a product from a tube of material comprising:

providing a tube of material, the tube having a first end, a second end, a wall disposed therebetween and a lumen extending therethrough, the tube wall having an interior zone having first area and interior portion being within the interior zone and having a second area being less than the first area;

providing a cutting device to cut said tube, said cutting device providing a hybrid liquid-jet/laser stream;

impinging the stream against the tube at a location between the first and second ends and within the interior zone;

establishing a cut lead-in by moving said tube relative to said stream until a portion of the stream fully penetrates the wall of the tube and extends into the lumen;

thereafter moving said tube relative to said stream to provide a cut along a predetermined cut path to remove the material from the interior portion, the second area being greater then area directly penetrated by the stream; and then removing the remainder of the material from the interior zone.

18. The method of claim 17, wherein the tube is moved relative to the stream at a constant velocity.

19. The method of claim 17, wherein said cut lead-in is established in a waste area.

20. The method of claim 17, wherein said laser is a pulsed laser having a repetition rate.

21. The method of claim 20, wherein said laser is operated at a first repetition rate during said cut lead-in.

22. The method of claim 21, wherein said laser is operated at a second repetition rate after said lead-in is established.

* * * * *